March 21, 1950 | H. A. HOWELL | 2,501,126

MAGNETIC RECORD MEDIUM

Filed Oct. 18, 1946

INVENTOR.
HUGH A. HOWELL
BY
The Firm of Charles W. Hills
ATTYS.

Patented Mar. 21, 1950 2,501,126

UNITED STATES PATENT OFFICE 2,501,126

MAGNETIC RECORD MEDIUM

Hugh A. Howell, Valparaiso, Ind., assignor to The Indiana Steel Products Company, Chicago, Ill., a corporation of Indiana Application October 18, 1946, Serial No. 704,034

1 Claim. (Cl. 274—41.4)

This invention relates to a magnetic record medium and method of making the same, and more particularly, to a record member having a tracking groove therein which defines a path of travel of the record member with respect to a magnetic head.

In the past, magnetic record members have been made such, for example, as magnetic disks in which a spiral groove has been provided and in which the entire member is formed of magnetizable material. It has also been suggested in the past to provide a magnetic record in which the base of the record is formed of one material and in which the lands between the grooves are formed of magnetizable material.

One of the principal features and objects of the present invention is to provide a novel record member having a tracking groove therein in which finely comminuted or powdered magnetic material is disposed in the bottom of the groove.

Another object of the present invention is to provide a novel magnetic record with a tracking groove therein in which magnetizable material is disposed in the bottom of a groove formed in a base of high permeability, low retentivity material.

Still a further object of the present invention is to provide a novel record member having a tracking groove therein in which the walls defining the groove are made of zinc or other non-magnetic metal, but in which the bottom of the groove, and at least a portion of the base of the record member, is formed of a material which has high magnetic permeability but low magnetic retentivity.

Another and still further object of the present invention is to provide a novel method of making magnetic record members in which a zinc-coated soft iron member is grooved, and the grooves then partially filled with magnetizable material.

The novel features which I believe to be characteristic of my invention are set forth with particularity in the appended claim. My invention itself, however, both as to its organization, manner of construction, and method of operation, together with further objects and advantages thereof, may be best understood by reference to the following description, taken in connection with the accompanying drawing, in which:

Figure 1:
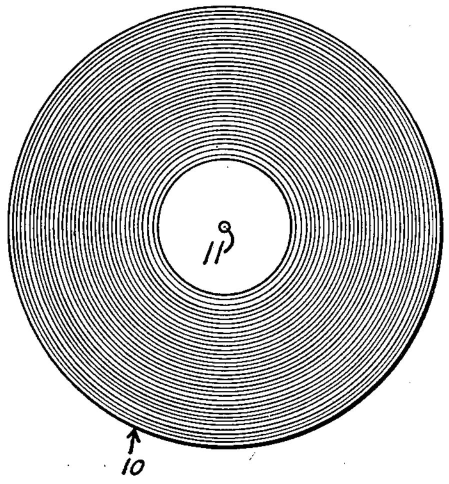
Figure 1 is a plan view of a magnetic disk record.

In Figure 1 of the drawing, I have illustrated a magnetic record disk 10 as being one form of a grooved magnetic record member which may be constructed in accordance with the teachings of the present invention.

Figure 2:
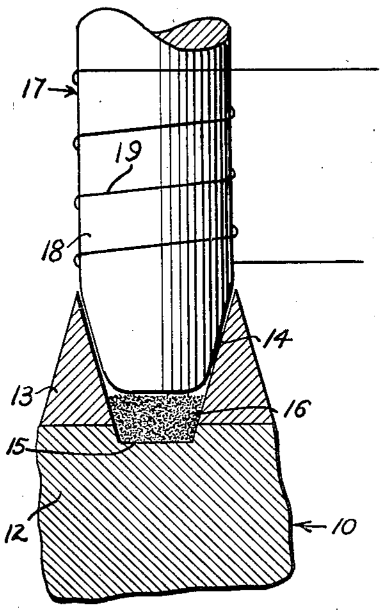
Figure 2 is a fragmentary elevational view of a portion of the record of Figure 1 with a diagrammatic representation of a magnetic head disposed in the groove.

The record 10 is provided with a central aperture 11 for receiving a turntable spindle or the like (not shown). The record member 10 when constructed in accordance with the teachings of the present invention, is formed of a base portion 12 (as shown in Figure 2) of a material having relatively high magnetic permeability but relatively low magnetic retentivity. This material, by way of example, and not by way of limitation, may be soft iron.

The main body portion 12 of the record member 10 has an upper layer 13 of some non-magnetic metal, such, for example, as zinc which may be grooved and given a fine smooth finish. As clearly shown in Figure 2, the upper portion of the member 10 is grooved as at 14, the base of the groove 15 being relatively flat and located in the main body portion 12 of the member 10. That is to say, the groove 14 extends clear through the layer 13 of zinc and into the soft iron base portion 12.

The groove 14 is partially filled with a magnetizable material 16 which may be of any suitable material having relatively high coercive force and hence relatively low retentivity. This material 16 is preferably of powder form having a binder mixed therewith to firmly hold and secure it in the bottom of the groove 14.

A magnetic transducer head 17 having a core 18 and a signal coil 19 is arranged to ride in the groove 14. To that end, the lower end of the core 18 is tapered to correspond to the taper of the groove 14. It will be noted that with a construction of this kind, the flux lines are substantially perpendicular and concentrated with the result that the resolution will be extremely good.

It will further be observed that by virtue of the use of a soft iron base 12, a single pole transducer head may be employed, and yet at the same time, have the effect of a closed magnetic circuit.

Figure 3:
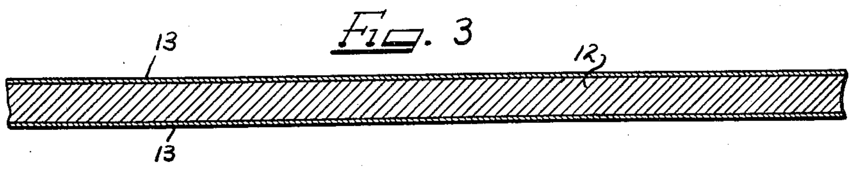
Figure 3 is an enlarged fragmentary sectional view of a disk about to be prepared for making a magnetic record thereof.
Figure 4:
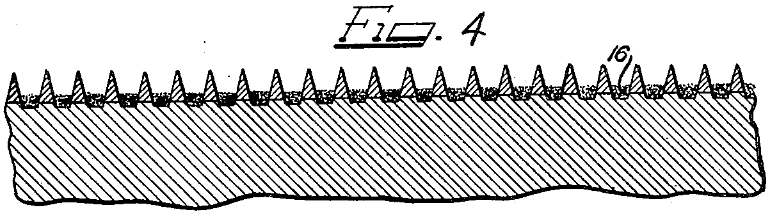
Figure 4 is an enlarged fragmentary sectional view of a portion of the upper part of the disk shown in Figure 3 after it has been grooved, and the grooves partially filled with magnetizable material.

Figures 3 and 4 of the drawing illustrate the manner in which the record may be made. A disk 12 of iron which is coated with zinc 13 on either one or both sides is first grooved in any manner to define the record path. When a disk is used, the record path is preferably in the form of a spiral groove. The record may also be formed on both sides as is clearly indicated in Figure 3.

After the base member 12 has been coated with zinc or some other non-magnetic material upon which a smooth finish may be given and at the same time have high wear resisting properties, the grooves are then partially filled with the magnetic material 16, as clearly indicated in Figure 4 of the drawing.

By way of example, and not by way of limitation, a more detailed reference will be made to one specific manner in which the record member may be made up. The soft iron disk 12 of Figure 3 is coated on both sides with zinc to a depth of about .01 inch. A spiral groove is formed in both surfaces so as to extend into the soft iron below the zinc and form a flat shallow trench in the iron itself.

The magetizable material is then sprayed on with an excess of solvent, and the particles drawn to the bottom of the groove by both gravity and a perpendicular magnetic field. Any coating adhering to the slanting sides of the groove is then removed by any suitable cutting or scraping tool, it being remembered that these sides of the groove are preferably smooth so as to form the main support for a short soft iron pole point of the electromagnetic transducer head 17 which would ride on the sides and barely touch the surface of the sound track coating.

While I have shown a particular embodiment of my invention, it will, of course, be understood that I do not wish to be limited thereto, and I, therefore, contemplate by the appended claim to cover all such modifications as fall within the true spirit and scope of my invention.

I claim as my invention:

A magnetic record member comprising a base member of relatively high magnetic permeability, low magnetic retentivity material, said member having a groove therein to define a track, the upper part of the walls defining said groove being formed of a non-magnetic metal and the groove being partially filled with a magnetizable material.

HUGH A. HOWELL.

REFERENCES CITED

The following references are of record in the file of this patent:

UNITED STATES PATENTS

| Number | Name | Date |
|---|---|---|
| 934,601 | Fuller | Sept. 21, 1909 |
| 1,074,424 | Fessenden | Sept. 30, 1913 |
| 2,229,293 | Huntley et al. | Jan. 21, 1941 |
| 2,381,463 | Potter | Aug. 7, 1945 |